Nov. 18, 1958 R. H. ROEDER 2,860,866
GOVERNOR
Filed Aug. 28, 1956 2 Sheets-Sheet 1

ROLF H. ROEDER
INVENTOR.

BY Daniel H. Bobis
atty

ROLF H. ROEDER
INVENTOR.

United States Patent Office 2,860,866
Patented Nov. 18, 1958

2,860,866

GOVERNOR

Rolf H. Roeder, Wuerzburg, Germany, assignor to Worthington Corporation, Harrison, N. J., a corporation of Delaware Application August 28, 1956, Serial No. 606,713

4 Claims. (Cl. 264—19)

The present invention relates to a governor and more particularly to a means for controlling the speed of the shaft, the control action of which is derived from the pressure of a rotating mass of fluid.

In accordance with the present invention, a hydraulic mechanical governor is provided comprising a vessel fixedly connected to and rotatable with the shaft of the device to be governed and a slidable piston member mounted in said vessel to form a liquid compartment for a predetermined amount of actuating fluid, the fluid to be rotated by intermeshing vanes on said vessel and piston, respectively, so that the fluid will cause the piston member to reposition itself in turn actuating a control rod connected thereto and to the mechanism which controls the speed of the device to be governed and hence the speed of the shaft, tension means being provided to normally urge the slidable piston member in a direction opposite but proportional to any decrease in force exerted by said actuating fluid on said piston member during operation.

The present invention provides a fluid pressure actuated governor which can be easily adjusted for any predetermined rate of speed by merely adding or draining liquid from the vessel compartment without exchanging any parts of the governor.

The present invention further provides a hydraulic mechanical governor wherein the action of centrifugal force transmitted through the actuating fluid is opposed directly by the tension means therein and thus eliminates friction, highly loaded bearings, wearing, maintenance, and replacement of parts.

The governor of the present invention further reduces wear, vibrations, and noise, and provides a good damper for axial and radial vibrations of the shaft to which it is fixed.

The present invention further provides a speed governor which produces a substantially instantaneous control action of the device being governed.

The present invention further provides a self-contained governor, insensible to changes in temperature, having a predetermined supply of liquid therein which is not dependent on a continuous supply of fluid.

The invention will be better understood from the following description when considered in connection with the accompanying drawings forming a part thereof, and in which.

Figure 1:
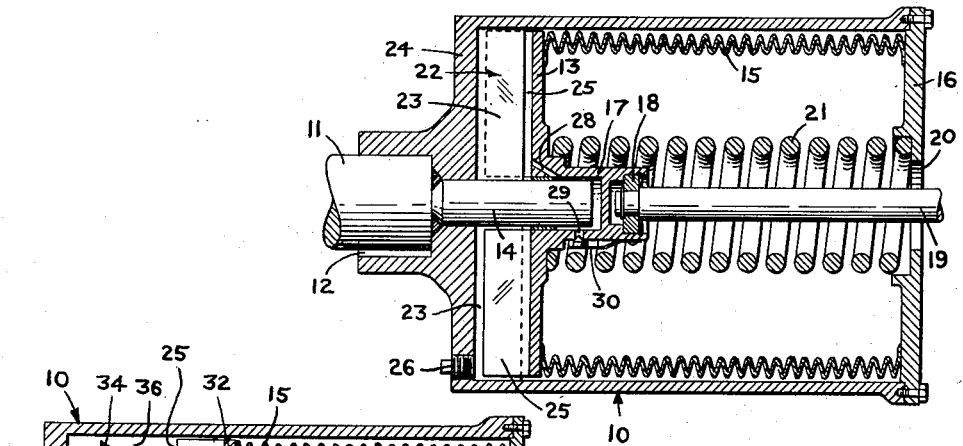
Figure 1 is a longitudinal section of a governor of the present invention.

Referring to Figure 1 of the drawings, the reference numeral 10 designates a substantially cylindrical vessel mounted on the end of a rotatable shaft 11 by a key 12 for rotation therewith. A diaphragm or piston 13 is slidably disposed within the vessel 10 and centered therein by pivoting bar 14 supported in the end of the vessel adjacent the shaft 11. A substantially cylindrical bellows 15 is secured at one end adjacent the outer edge of diaphragm 13 and at the other end to end plate 16 of vessel 10. Diaphragm 13 is provided with a hub 17 which extends inwardly of bellows 15. A thrust bearing 18 is disposed in the inner end of hub 17. Thrust bearing 18 is mounted on a non-rotating governor shaft 19 which extends into bellows 15 through a central opening 20 in plate 16. A spring 21 has one end in abutment with the piston 13 and is disposed about hub 17 and rod 19, the opposite ends thereof bearing against plate 16 and diaphragm 13 to maintain the diaphragm adjacent one end of vessel 10. The outer end of the non-rotating rod 19 is connected to a mechanism, not shown, which controls the rotational speed of shaft 11. For example, if shaft 11 is a turbine shaft, rod 19 would be connected to a valve mechanism which controls the supply of steam to the turbine.

As is further shown in Figure 1, the diaphragm or piston 13 is so disposed in the vessel 10 that a compartment 22 is formed therein at the end of the vessel 10 connected to the shaft 11. This end of the vessel 10 is also provided with circumferentially spaced radially extending vanes 23 which extend axially into the compartment 22 to intermesh and overlap with a plurality of similarly circumferentially spaced and radially extending vanes on the inner face of the diaphragm 13. A plug 26 is also provided in the vessel 10 which communicates with the compartment 22 and provides means for introducing the desired amount of fluid therein for the specific governing speed.

Passageways 28 and 29 are provided in hub 17 to communicate compartment 22 with the atmosphere when the vessel 10 is rotating. A leaf spring 30 is connected to hub 17 and adapted to close passageway 29 when the vessel is not rotating, to prevent fluid from compartment 22 from entering the inside of bellows 15.

In operation, when it is desired to set the governor for controlling the speed of shaft 11 for a predetermined speed, vessel 10 is turned until plug 26 is on the top and a predetermined amount of fluid is introduced into compartment 22 by merely removing the plug and pouring the liquid therein. Thereafter, the plug is inserted back into vessel 10 and the hydro-mechanical governor is thus adjusted for the desired speed range. Since lubricating oil is used in most cases for the governor fluid, the governor of the present invention can be adjusted in the field by unskilled labor, since all that is required for a predetermined speed range is the proper amount of fluid in the governor, without rearranging any parts of the governor or exchanging them. Thereafter, shaft 11 is rotated by means, not shown, and rotates or turns governor vessel 10 therewith. When vessel 10 is rotated the rotating liquid, vanes 23 and 25 will force the liquid in compartment 22 to rotate at the same rate of speed as the vessel, and the liquid when thus rotated will form an almost concentric ring of revolving fluid adjacent the periphery of compartment 22 in the vessel 10. When the rotational speed of shaft 11 increases beyond the predetermined value for which the governor is set, since the liquid in compartment 22 is rotating at the same speed as the shaft due to the action of the vanes 23 and 25 thereon, the average pressure in the liquid ring increases. Thus, the pressure of this rotating mass of liquid moves or slides diaphragm 13 axially in a direction away from shaft 11, or to the right looking at Fig. 1, thereby moving the non-rotating governor rod 19 therewith to actuate the mechanism, not shown, to decrease the rotational speed of shaft 11 to the predetermined speed.

When the rotational speed of shaft 11 falls below the predetermined value for which the governor is set, the rotational speed of vanes 23 and 25 decreases therewith and causes the liquid in compartment 22 to rotate at the same rate as the vanes and shaft. Thus, the pressure of the liquid decreases, and the tension in spring 21 moves diaphragm 13 axially in a direction towards shaft 11, or to the left looking at Figure 1, thereby moving governor rod 19 therewith to actuate the mechanism, not shown, to increase the rotational speed of shaft 11. Thus, the rotation of shaft 11 is increased to the predetermined value for which the governor is set.

Figure 2:
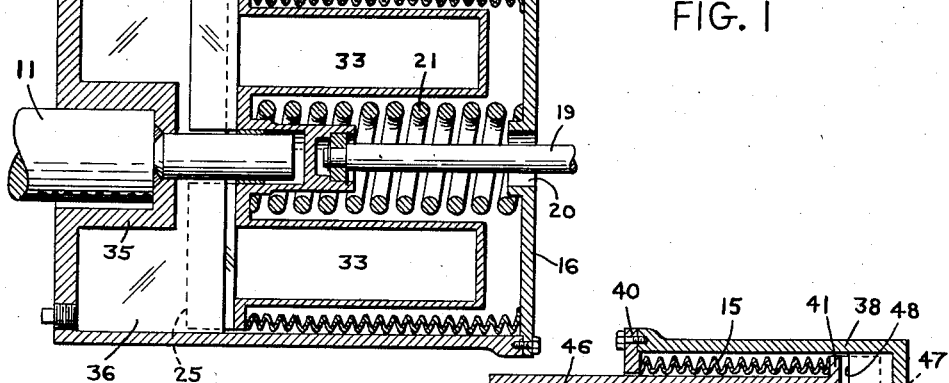
Figure 2 is a view similar to Figure 1 showing another modification of the present invention.

The embodiment of the governor shown in Figure 2 is substantially the same as that in Figure 1, except diaphragm 32 provides an annular chamber 33 positioned between bellows 15 and spring 21. The annular chamber 33 is in communication with the liquid compartment 34 to form a larger area for containing liquid therein. Shaft 11 is keyed to a hub 35 of the vessel 10 which extends into compartment 34, and the vanes 36 of the vessel will thus become substantially L-shaped, while vanes 25 of the diaphragm are identical with those above described.

The operation of the governor in Figure 2 is substantially the same as that in Figure 1, except that due to increased volume of liquid therein a change in the speed of shaft 11 will not change the inner radius of the rotating concentric liquid ring in compartment 34 and chamber 33 as much as the inner radius of the liquid ring in compartment 22 of Figure 1.

Figure 3:
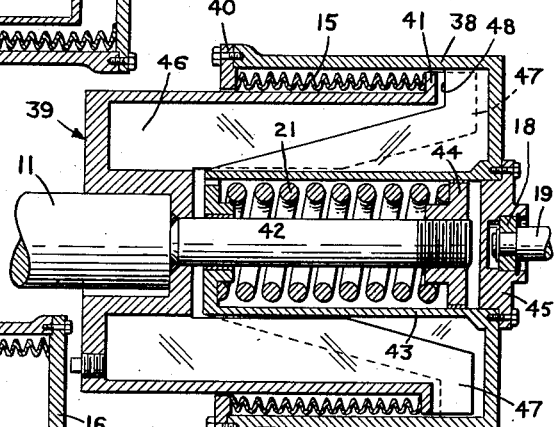
Figure 3 is a view similar to Figure 1, illustrating a still further embodiment of the governor of the present invention.

The embodiment of the invention in Figure 3 is substantially the same as that shown in Figure 1, except that the diaphragm 38 forms a part of the governor vessel 39. Diaphragm 38 is substantially cylindrical shaped and is provided with an annular plate 40 connected thereto. Diaphragm 38 is connected to the vessel body for relative axial movement therewith by bellows 15, connected at one end to plate 40, and at the other end to a flange 41 extending outwardly from the vessel body so that bellows 15 is positioned between the diaphragm and vessel. Diaphragm 38 is supported by pivoting bar 42 which extends into a sleeve 43 formed centrally of the diaphragm. Spring 21 is arranged on pivoting bar 42 within the sleeve and held in contact with the diaphragm by a retainer nut 44 threaded on one end of the bar. The non-rotating governor rod 19 and its thrust bearing 18 are supported in a flange 45 extending into sleeve 43 and connected thereto by bolts or other suitable means. The longitudinally extending liquid compartment 46 in vessel 39 is provided with longitudinally extending vanes 47 extending from one end thereof to a point beyond flange 41 to intermesh with the diaphragm vanes 48 extending longitudinally of sleeve 43, and transversely of the diaphragm at a point beyond flange 41 of the vessel.

The operation of the invention in Figure 3 is substantially the same as that shown in Figure 1, except that the inner radius of the liquid ring in the compartment 46 will remain more constant than the inner radius of the liquid ring in compartment 22 of Figure 1 with changes in speed of shaft 11 due to the increased volume of liquid contained therein.

Figure 4:
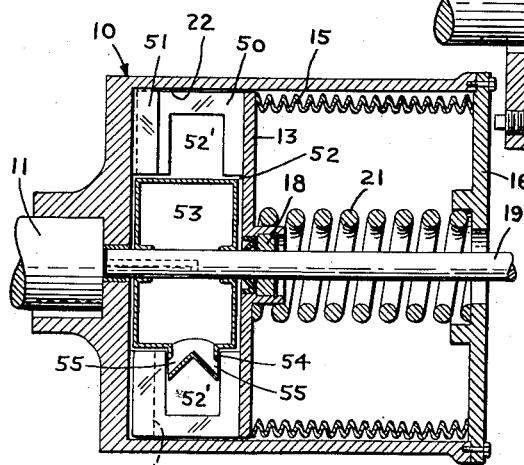
Figure 4 is still a further modification of the invention shown in Figure 1.

The invention as shown in Figure 4 is substantially similar to the form of the invention illustrated in Figure 1 except that the circumferentially disposed diaphragm vanes 50 are U-shaped elements which extend radially from points medially on the face of the diaphragm member 13 instead of from the axial center thereof, the vessel body vanes 51 being similarly disposed and engaging only the leg remote from the leg connected to the face of the diaphragm so that the inner edges of the respective intermeshing vanes define a medial portion 52 and an annular portion 52' concentric of and continuous with the medial portion in the liquid compartment 22.

In the medial portion 52 defined by the vanes is a liquid container 53 which is fixedly mounted to the governor control rod 19. The non-rotatable liquid container 53 is provided with a nozzle 54 extending a fixed radial distance into the annular portion 52' of the liquid compartment 22. The nozzle 54 in turn has axially disposed ports 55 which communicate with the annular portion 52' of the liquid compartment 22 at the point just adjacent the inner edges of the intermeshing vanes 50 and 51, all of which is clearly shown in Figure 4 of the drawings.

In operation, rotation of the governor will cause the fluid in the liquid compartment 22 to actuate the diaphragm member 13 as above described for the form of the invention shown in Figure 1.

The liquid container 53, however, operates to make actuation of the diaphragm substantially instantaneous with variations in the speed of the governor caused by variations of the load so that the governor will return the device being governed to the predetermined speed setting with a minimum amount of "hunting." This is accomplished through nozzle 54 and axial ports 55 which act to discharge or drain fluid from and to the liquid compartment in accordance with the acceleration and deceleration of the speed of the governor whereby the inner radius of the fluid ring formed in the liquid compartment 22 will be maintained substantially constant independently of the axial movement of the diaphragm 13.

Figure 5:
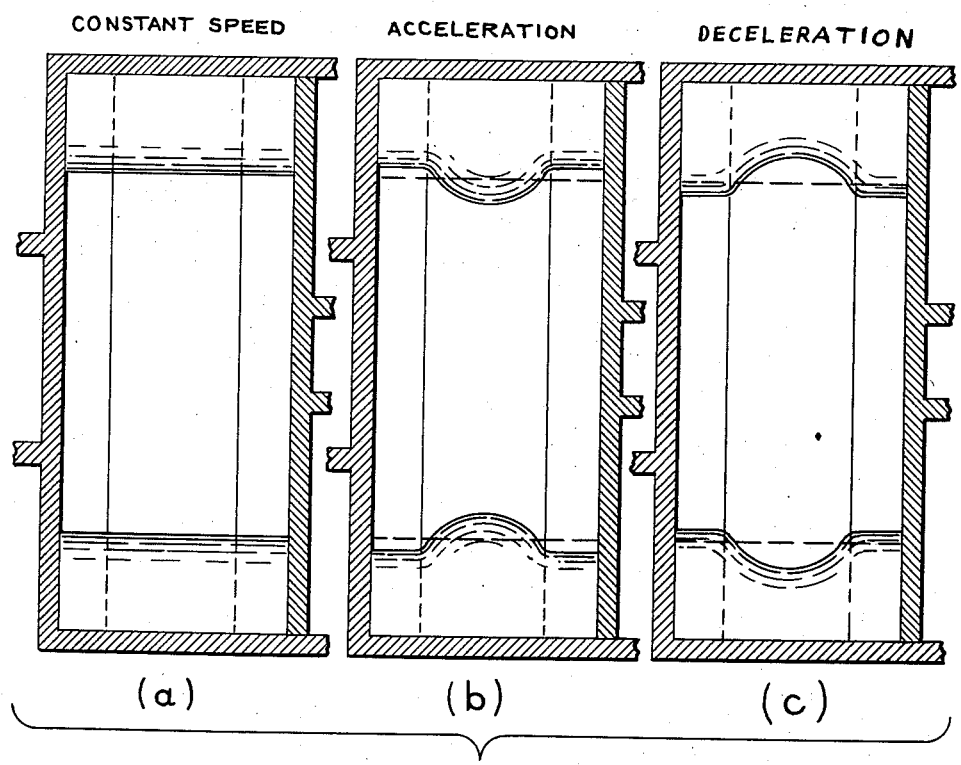
Figure 5 is a diagram illustrating the effect of acceleration and deceleration in the form of the invention shown in Figure 4.

Thus, referring to Figure 5, Figure 5a shows the condition of the fluid ring in compartment 22 when the load on the device being governed is substantially constant. Figure 5b shows the dynamic condition as the load varies to cause the shaft and hence the governor speed to accelerate. Under this condition, the portion of the liquid in compartment 22 which is confined between the intermeshing vanes 50 and 51 will be accelerated with the governor while that portion of the fluid in the compartment 22 disposed in the annular portion 52' will lag due to the inertia of the mass of the fluid. The higher pressure or force of the faster rotating mass of fluid disposed between the vanes 50 and 51 will act to force the fluid in the annular portion 52' toward the center of the compartment 22 creating a free surface substantially as shown in Figure 5b. However, since the axial openings 55 of the nozzle 54 communicate with the space adjacent the portion of the compartment occupied by the intermeshing vanes 50 and 51 and the fluid contained therebetween, liquid is instantaneously discharged into this space formed between the intermeshing vanes to join the mass of fluid and to rotate therewith thereby increasing the static head or pressure which will in turn move the diaphragm 13 in turn actuating the rod 19 connected thereto and to the mechanism, not shown, controlling the device to be governed to reduce the speed thereof to the predetermined speed setting of the governor.

Conversely, Figure 5c shows the dynamic condition when the load on the device to be governed increases, thereby causing the shaft and, hence, the governor to decelerate. When this occurs the portion of the fluid which is confined between vanes 50 and 51 will in turn be decelerated at the same time while the liquid in the annular portion 52' will continue in motion at the higher speed. The higher force now exerted by the faster moving mass of fluid in the annular portion 52' will cause the fluid rotating in the compartment 22 to assume a free surface similar to that shown in Figure 5c and once again by reason of the position of the axial ports 55 in the nozzle 54 fluid will be caused to drain off from the intermeshing vanes 50 and 51 thereby reducing the static head or pressure in the total mass of fluid in the compartment 22 acting against the diaphragm 13. Spring 21 will now act to move the diaphragm member 13 in a direction opposite and proportional to the force exerted by the fluid in the liquid compartment which in turn causes the diaphragm to actuate the governor rod 19 in a direction towards the shaft end of the vessel 10 to signal the mechanism to increase the speed of the device to the predetermined speed setting of the governor.

It will be understood that changes may be made in the form, location and materials used in the construction of an arrangement of the various parts of the apparatus disclosed herein without departing from the principles of the invention which is not to be limited excepting by the scope of the appended claims.

What is claimed is:

1. A speed control governor for a rotatable shaft comprising a cylindrical vessel fixed to said shaft for rotation therewith, axial slidable means connected to the vessel for rotation therewith, a non-rotating governor rod carried by said slidable means adapted to be moved axially of said vessel by said slidable means, a compartment in said vessel formed by said slidable means for containing liquid therein, said rod extending into said compartment, liquid holding means fixedly connected on the rod portion disposed in said compartment in communication with said compartment for receiving liquid from said compartment and discharging liquid thereto, vane means disposed in said compartment for rotating liquid therein to move said slidable means and governor rod axially in one direction when the shaft speed increases above a predetermined value, and tension means for moving the slidable means and said rod axially in the opposite direction when the shaft speed decreases below a predetermined value whereby the governor responds instantaneously to speed variations.

2. The speed control governor of claim 1 wherein liquid holding means comprises a cylindrical container and a radial extending nozzle connected thereto having an axial opening therein.

3. The speed control means of claim 2 wherein said vane means are disposed in said compartment adjacent the outer periphery of said cylindrical container, said vanes having cut-out portions therein to form an annular recess for receiving said radial nozzle, and parts on said nozzle opening axially to communicate with said annular recess.

4. A speed control governor for a rotatable shaft comprising a cylindrical body fixed to said shaft for rotation therewith, a circular shaped disc disposed in said body, a bellows connected to the circumferential portion of said diaphragm at one end thereof and to the circumferential portion of the body end wall at the other end thereof to permit axial movement of the diaphragm in said body, a liquid compartment formed in one end of said body by said diaphragm, a non-rotating governor rod carried by said diaphragm adapted to be moved in an axial direction by said diaphragm, said rod extending into said bellows and compartment, a cylindrical container fixedly connected on the rod portion disposed in said compartment and having a radial nozzle thereon, said nozzle having an axial opening therein to receive liquid from said compartment and discharge liquid thereto, radial vanes disposed on said body and diaphragm and extending into said compartment between one another for rotating liquid therein to move said diaphragm axially in one direction when the shaft speed increases above a predetermined value, and tension means for moving the diaphragm and rod axially in the opposite direction when the shaft speed decreases below a predetermined value.

References Cited in the file of this patent

UNITED STATES PATENTS

| 2,247,989 | Cita | July 1, 1941 |
| 2,642,275 | Sollinger | June 16, 1953 |

FOREIGN PATENTS

| 763 | Great Britain | Feb. 24, 1877 |
| 155,245 | Great Britain | Nov. 24, 1921 |
| 748,113 | Great Britain | Apr. 18, 1956 |